United States Patent Office 3,422,017
Patented Jan. 14, 1969

---

3,422,017
LUBRICANT COMPOSITIONS CONTAINING AMINE SALTS
James G. Dadura, Fishkill, Edwin C. Knowles, Poughkeepsie, and Frederic C. McCoy, Beacon, N.Y., assignors to Texaco Inc., New York, N.Y., a corporation of Delaware
No Drawing. Continuation-in-part of application Ser. No. 183,353, Mar. 29, 1962. This application June 1, 1965, Ser. No. 460,579
U.S. Cl. 252—49.9          8 Claims
Int. Cl. C10m 1/44; C07f 9/04

This application is a continuation-in-part of application Ser. No. 183,353, filed Mar. 29, 1962, now abandoned.

This invention relates to novel amine salts of the fluorophosphoric acids and to lubricating compositions containing said salts. More particularly, this invention relates to fluorophosphoric acid salts of primary, secondary and tertiary amines and to lubricating compositions containing said salts.

The usefulness of many organo-phosphorous compounds such as phosphate esters as lubricating oil additives has been seriously hindered by the lack of hydrolytic stability of such compounds. An advantage of the phosphorus compounds of the present invention is that they are hydrolytically stable, oxidation stable and thermally stable in both storage and use. The novel amine salts of the present invention are formed by the reaction of an amine and a fluorophosphoric acid and are useful as a source of nitrogen and phosphorus in soil conservation and fertilization and in the plant tracer field. The higher molecular weight compounds containing 8 or more carbon atoms are useful as load carrying additives for mineral and synthetic base lubricating oils.

The present invention is concerned with these novel salts and their use as lubricant additives.

The amine salts of the fluorophosphoric acids of the present invention are represented by either the acid salts or neutral salts shown in the following general formulae:

(a)   $(R''R'RN^+H)_2P=O_3F$
(b)   $R''R'RN^+HP^-O_2F_2$
(c)   $R''R'RN^+HP^-F_6$
(d)   $(R''R'RN^+H)HP^-O_3F$ and (e)   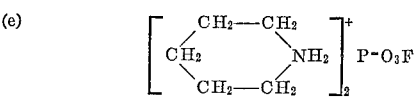  $P^-O_3F$ wherein R is a hydrocarbyl radical or a hydroxy substituted hydrocarbyl radical containing at least one and preferably at least 8 to 30 carbon atoms and R' and R" are hydrogen, a hydrocarbyl radical or a hydroxy substituted hydrocarbyl radical containing 1 to about 24 carbon atoms. The terms hydrocarbyl when used herein denotes a monovalent hydrocarbon radical.

In accordance with the present invention, novel amine salts of fluorophosphoric acid compositions are prepared by reacting a fluorophosphoric acid with an amine containing 1 or more carbon atoms and preferably at least 8 to 30 carbon atoms. The reaction mixture is diluted with a solvent and the reaction is conducted at a moderate temperature under normal atmospheric pressure. The reaction is completed by stripping the solvent at atmospheric pressure and the amine salt of the present invention is obtained.

The amines employed in the formation of the novel salts of fluorophosphoric acids may be primary, secondary or tertiary aliphatic amines, cycloaliphatic amines, hydroxy substituted hydrocarbyl radical or heterocyclic amines. The amines are represented by the following formulae:

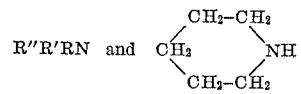

wherein R is a hydrocarbyl radical or a hydroxy-substituted hydrocarbyl radical containing at least one and preferably at least 8 to 30 carbon atoms and R' and R" are hydrogen, a hydrocarbyl radical or a hydroxy substituted hydrocarbyl radical containing 1 to about 24 carbon atoms.

The fluorophosphoric acids employed in the formation of the compounds of the present invention are prepared by the general methods described on pages 713 to 715 of volume 6 of the Encyclopedia of Chemical Technology by R. E. Kirk and D. F. Othmer published by The Interscience Encyclopedia, Inc., New York, N.Y., 1951.

Upon formation of the acids described above, the amine is reacted therewith to obtain the amine salts of the present invention, the reaction for which can be represented by the following general equations:

$2R''R'RN + H_2PO_3F \rightarrow (R''R'RN^+H)_2P=O_3F$
$R''R'RN + HPO_2F_2 \rightarrow R''R'RN^+HP^-O_2F_2$
$R''R'RN + HPF_6 \rightarrow R''R'RN^+HP^-F_6$
$R''R'RN + H_2PO_3F \rightarrow (R''R'RN^+H)HP^-O_3F$

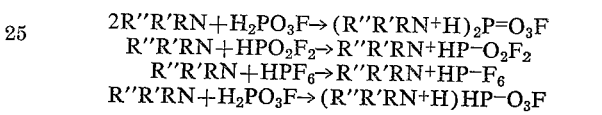

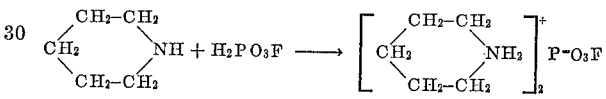

wherein R is a hydrocarbyl radical or a hydroxy substituted hydrocarbyl radical containing at least one and preferably 8 to 39 carbon atoms and R' and R" are hydrogen, a hydrocarbyl radical or a hydroxy substituted hydrocarbyl radical containing 1 to about 24 carbon atoms.

Amine salts of the present invention are illustrated by the following: di-(t-$C_{11}$-$C_{14}$ alkyl primary amine) monofluorophosphate, t-$C_{11}$-$C_{14}$ alkyl primary amine difluorophosphate, t-$C_{11}$-$C_{14}$ alkyl primary amine hexafluorophosphate di-(t-$C_{18}$-$C_{22}$ alkyl primary amine) monofluorophosphate, t-$C_{18}$-$C_{22}$ alkyl primary amine difluorophosphate, t-$C_{18}$-$C_{22}$ alkyl primary amine hexafluorophosphate, di-(triamylamine) monofluorophosphate, triamylamine difluorophosphate, triamylamine hexafluorophosphate, di-(ethanolamine) monofluorophosphate, ethanolamine difluorophosphate, ethanolamine hexafluorophosphate, di-(N,N-dimethylhexadecylamine) monofluorophosphate, N,N-dimethylhexadecylamine difluorophosphate, N,N-dimethylhexadecylamine hexafluorophosphate, di-(caprylamine) monofluorophosphate, caprylamine difluorophosphate, caprylamine hexafluorophosphate, di-(tricaprylamine) monofluorophosphate, tricaprylamine difluorophosphate and tricaprylamine hexafluorophosphate.

The preparation of the novel acid-amine salts of fluorophosphoric acids of the present invention is illustrated in the following examples. In the following examples all reactions were exothermic and the rate of addition was controlled so as to maintain the reaction temperature at between 40° and 50° C. except where noted otherwise.

Example 1.—Preparation of mono-trioctylamine monofluorophosphate 31.4 grams, 0.314 mol, of anhydrous monofluorophosphoric acid was added dropwise with stirring over a period of 30 minutes at 45 to 50° C. to 110.8 grams, 0.314 mol of tricaprylamine (trioctylamine) dissolved in 200 mls. of benzene. After stirring for one half hour at ambient temperature the product was stripped to give 139 grams of a clear viscous liquid soluble in both mineral and synthetic oils which was identified as mono-trioctyl-amine monofluorophosphate, the formula for which is:

$$[(C_8H_{17})_3NH]HPO_3F$$

Example 2.—Preparation of t-$C_{18}$–$C_{22}$ alkyl primary amine monofluorophosphate In the same manner as Example 1, 59.8 grams, 0.598 mol, of monofluorophosphoric acid was added dropwise over a period of 50 minutes to 188.4 grams, 0.598 mol, of a mixture of t-$C_{18}$–$C_{22}$ alkyl primary amines. The clear viscous reaction product was stirred for 1 hour at 75° C. A clear viscous liquid was obtained which was soluble in both mineral and synthetic oils and identified as t-$C_{18}$–$C_{22}$ alkyl primary amine monofluorophosphate, the formula for which is:

$$[RNH_3]HPO_3F$$

Example 3.—Preparation of t-$C_{18}$–$C_{22}$ alkyl primary amine difluorophosphate In the same manner as Example 1, 42.2 grams, 0.433 mol, of anhydrous difluorophosphoric acid was added to 137 grams, 0.434 mol, of t-$C_{18}$–$C_{22}$ alkyl primary amine dissolved in 200 ml. of benzene. 182 grams of a clear brown liquid was obtained which was soluble in both mineral and synthetic oils and was identified as t-$C_{18}$–$C_{22}$ alkyl primary amine difluorophosphate, the formula for which is:

$$RNH_3PO_2F_2$$

Example 4.—Preparation of di-t-$C_{18}$–$C_{22}$ alkyl primary amine monofluorophosphate In the same manner as Example 1, 129 grams, 1.29 mol, of monofluorophosphoric acid was added to 813 grams, 2.58 mols, of t-$C_{18}$–$C_{22}$ alkyl primary amine dissolved in 500 ml. of n-hexane. 934 grams of a slightly hazy viscous liquid which was soluble in both mineral and synthetic oils was obtained and identified as di-t-$C_{18}$–$C_{22}$ alkyl primary amine monofluorophosphate, the formula for which is:

$$[RNH_3]_2PO_3F$$

Example 5.—Preparation of mono-triamylamine monofluorophosphate

In the same manner as Example 1, 42.7 grams, 0.427 mol, of monofluorophosphoric acid was added to 194 grams, 0.854 mol, of triamylamine dissolved in 200 ml. of benzene. The stripped product separated into an upper amine layer of 93.4 grams, 0.4 mol, and a lower layer of mono-triamyl monofluorophosphate 137.4 grams, 0.4 mol. The mono-triamyl monofluorophosphate, a very viscous liquid, is soluble in synthetic oils, the formula for which is:

$$[(C_5H_{11})_3NH]HPO_3F$$

Example 6.—Preparation of t-$C_{18}$–$C_{22}$ alkyl primary amine hexafluorophosphate 106 grams, 62 ml., 0.473 mol, of commercially available 65% hexafluorophosphoric acid were added with stirring over a period of 15 minutes to 149 grams, 0.417 mol, of a mixture of t-$C_{18}$–$C_{22}$ alkyl primary amine. The pot temperature rose from 28 to 75° C. No water could be removed azeotropically when the reaction mixture was refluxed. The mixture was filtered to remove a few grams of unidentified solids and was stripped to give 234 grams of a viscous dark brown liquid and identified as t-$C_{18}$–$C_{22}$ alkyl primary amine hexafluorophosphate, the formula for which is:

$$[RNH_3]PF_6$$

Example 7.—Preparation of N(t-$C_{11}$–$C_{14}$)alkyl-2-hydroxy-ethylamine monofluorophosphate In the same manner as Example 1, 86 grams, 0.86 mol of anhydrous monofluorophosphoric acid was added to 205 grams, 0.86 mol, of N(t-$C_{11}$–$C_{14}$)alkyl-2-hydroxyethylamine dissolved in 100 ml. of benzene. The reaction product was stripped and 301 grams of a very viscous liquid was obtained and identified as N($C_{11}$–$C_{14}$)alkyl-2-hydroxyethylamine monofluorophosphate, the formula for which is $$[HOCH_2CH_2NH_2R]HPO_3F$$

Example 8.—Preparation of di-cyclohexylamine monofluorophosphate

In the same manner as Example 1, 37 grams, 0.37 mol, of anhydrous monofluorophosphoric acid was added over a period of 30 minutes to 73.3 grams, 0.74 mol, of cyclohexylamine dissolved in 300 ml. of benzene. An exothermic reaction took place and a white powder separated which was filtered and washed with benzene and dried. The white powder was identified as dicyclohexylamine fluorophosphate, the formula for which is:

$$[C_6H_{11}NH_3]_2PO_3F$$

Example 9.—Preparation of di-dodecylaniline monofluorophosphate

In the same manner as Example 1, 59 grams, 0.59 mol of anhydrous monofluorophosphoric acid was added over a period of 15 minutes to 303 grams, 1.18 mol, of freshly distilled dodecylaniline dissolved in 300 ml. of benzene. An exothermic reaction took place as indicated by a temperature rise in the pot of from 27 to 42° C. The reaction product was stripped and a light brown liquid which darkened on standing and which was soluble in both mineral and synthetic oils was obtained and identified as di-dodecylaniline fluorophosphate, the formula for which is:

$$[C_{12}H_{23}\text{—}C_6H_4\text{—}NH_3]_2PO_3F$$

Example 10.—Preparation of di-piperidine monofluorophosphate

In the same manner as Example 1, 42 grams, 0.42 mol of anhydrous monofluorophosphoric acid was added over a period of 27 minutes to 71.4 grams, 0.84 mol of piperidine dissolved in 300 ml. of benzene. The product was stripped and a supercooled liquid was obtained which on standing slowly turned to an amorphous solid. 103 grams of the product was obtained and identified as di-piperidine monofluorophosphate, the formula for which is:

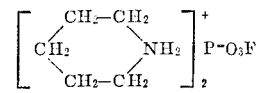

Example 11.—Preparation of bis-(di-2-ethylhexylamine) monofluorophosphate

In the same manner as Example 1, 58.4 grams, 0.584 mol, of anhydrous monofluorophosphoric acid was added over a period of 1 hour to 282 grams, 1.17 mol, of di-2-ethylhexylamine dissolved in benzene. The reaction product was stripped and 338 grams of a clear liquid which was soluble in synthetic oils was obtained and identified as bis-(di-2-ethylhexylamine) monofluorophosphate, the formula for which is:

$$[(C_4H_9CH(C_2H_5)CH_2)_2NH_2]_2PO_3F$$

The lubricating oils of this invention include hydrocarbon lubricating oils and synthetic lubricating oils. The hydrocarbon oils found to be useful for this invention include oils having a viscosity in the range required for lubricating fluids and in particular hydrocarbon mineral oils which include paraffin base, naphthene base, mixed paraffin-naphthene base and mineral oils of the residual or distillate type. The hydrocarbon lubricating base generally has been subjected to solvent refining to improve its oxidation and thermal stability and viscosity-temperature properties as well as solvent dewaxing to remove waxy components and to improve the pour properties of the oil. Broadly speaking, hydrocarbon lubricating oils having an SUS viscosity at 100° F. of between 50 to 2500 are used in the formulation of the improved lubricants of this invention.

The mineral lubricating oils to which the amine salts of this invention are added usually contain other additives designed to impart desirable properties thereto. For example, viscosity index improvers such as the polymethacrylates having a molecular weight ranging from 5000 to 500,000 are usually included therein. The VI improver normally used is a polymethacrylate having the following recurring structural unit:

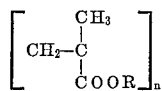

wherein R is an aliphatic radical ranging from butyl to stearyl and $n$ is an integer of more than 1.

The use of various metal base organic type additives has been found effective and are generally incorporated in the lubricating oils of this invention, particularly those oils used in high speed, spark ignition and diesel engines to reduce ring sticking, minimize lacquer formation and carbon deposits.

The hydrocarbon lubricating oils of this invention may also contain other useful additives such as metal sulfonates to afford additional detergent-dispersant properties, metal di-alkyl dithiophosphates to afford additional corrosion and oxidation resistance, anti-foam agents such as silicone polymers in the amounts of about 5 to 200 parts per million, etc.

The esters which constitute the synthetic lubricant composition of this invention are broadly described as esters of hydrocarbyl carboxylic acids. They are high molecular weight materials of lubricating oil characteristics derived from alcohols which are usually aliphatic alcohols containing one or more hydroxyl radicals and monocarboxylic acids which are usually aliphatic carboxylic acids containing one or more carboxylic acid radicals.

Widely used synthetic ester lubricants are aliphatic diesters of aliphatic dicarboxylic acids containing 6–12 carbon atoms. From the standpoint of cost and availability, the preferred dibasic acids are adipic acid, sebacic acid and azelaic acid. The aliphatic alcohols used to form the diesters usually contain at least 4 carbon atoms and up to 20 or more carbon atoms. $C_6$–$C_{18}$ alcohols are most commonly used. Ether alcohols such as Cellosolve and Carbitol may also be used in the formation of the aliphatic diesters of organic dicarboxylic acids used as the lubricating base in the compositions of this invention. Alcohols containing 2 or more hydroxyl radicals and no hydrogen substituted on the beta carbon atoms such as trimethylol propane and pentaerythritol have proven particularly effective in formulating stable high temperature ester lubricants.

Examples of alkyl esters of aliphatic carboxylic acids are the following: di-isooctyl azelate, di-2-ethylhexyl sebacate, di-2-ethylhexyl azelate, di-2-ethylhexyl adipate, dilauryl azelate, di-sec-amyl sebacate, di-2-ethylhexyl alkenyl-succinate, di-2-ethyoxyethyl sebacate, di-2-(2′-methoxyethoxy) ethyl sebacate, di-2-(2′-butoxyethyoxy) ethyl sebacate, di-2-butoxyethyl azelate, di-2-(2′-butoxyethoxy) ethyl alkenyl-succinate, pentaerythritol tetracaproate and trimethylol propane tri-isooctanoate.

In addition to such esters, polyester lubricants formed by a reaction of an aliphatic dicarboxylic acid, a dihydroxy compound and a monofunctional compound, which is either an aliphatic monohydroxy alcohol or an aliphatic monocarboxylic acid, in specified mol ratios are also employed as the synthetic lubricating base in the compositions of this invention; polyesters of this type are described in U.S. 2,628,974 on Polyester Synthetic Lubricants, which issued to R. T. Sanderson on Feb. 17, 1953. Polyesters formed by reaction of a mixture containing specified amounts of 2-ethyl-1,3-hexanediol, sebacic acid, and 2-ethylhexanol and by reaction of a mixture containing adipic acid, diethylene glycol and 2-ethylhexanoic acid illustrate this class of synthetic polyester lubricating bases.

The sulfur analogs of the above described esters are also used in the formulation of the lubricating compositions of this invention. Dithioesters are exemplified by di-2-ethylhexyl thiosebacate, di-n-octyl thioadipate and the dilaurate of 1,5-pentanedithiol; sulfur analogs of polyesters are exemplified by the reaction product of adipic acid, thioglycol and 2-ethylhexyl mercaptan.

Alkyl-substituted phenols are usually incorporated in the lubricants of the invention as anti-oxidants. The preferred and most commonly used alkyl phenol anti-oxidants are 2,6-di-tertiary octylphenol; 2,6-di-tertiary amyl-4-methylphenol; and 2,6-di-isopropyl-4-methylphenol. Hindered phenols of this type are employed in concentrations between 0.1 and 2.0 weight percent.

Although hindered phenol type anti-oxidants are the most widely used anti-oxidants in the lubricant compositions of the invention, aryl-substituted amine anti-oxidants such as phenylnaphthylamine, phenylene diamine, and diphenylamine are also used in lubricants in conjunction with the extreme pressure additive of the invention. The amine anti-oxidants are employed in the same concentrations as the hindered phenol anti-oxidant. Phenothiazine is also a preferred anti-oxidant and may be used in higher concentrations.

Organic silicones are normally incorporated in the lubricants of the invention to impart thereto anti-foam properties. The silicones are usually of the dialkyl or mixed alkyl-aryl silicone type. Dimethyl silicone is normally employed as the anti-foam agent. The silicone is incorporated in the lubricant by means of a kerosene concentrate containing 5 to 15 weight percent silicone. A very satisfactory anti-foam agent is a kerosene concentrate 10 weight percent dimethyl silicone. The kerosene concentrate is employed in an amount sufficient to provide a silicone polymer concentration of from 50 to 250 parts per million based on the total lubricant composition.

To demonstrate the excellent improvement in the load-carrying ability of lubricating oils containing the amine salts of the fluorophosphoric acids of this invention, a high speed gear scuff test was used. This test, called the Ryder Gear Test, is intended for the evaluation of the scuff-limited load-carrying ability of those lubricants used in reduction and accessory drives of turbo-jet and turbo-prop engines. The method of test provides for the running of two spur gears in a Pratt and Whitney Gear and Lubricant Tester (also termed the Ryder Gear Tester). The oil inlet temperature to the gears was 165°±5° F. The face width of the driven gear was 0.937 inch and the face width of the driving gear was 0.25 inch. The dynamometer speed of the gear tester was 3830 r.p.m. (equivalent to a gear speed of 10,000 r.p.m.) and loading pressure of 2½ p.s.i. applied during break-in. After running for 10 minutes, the tester was shut down and the driving gear removed and an estimate of the percentage of tooth area scuffed on each tooth of that gear was made. The gear was replaced and the above procedure continuously repeated using a higher loading pressure with increments of 5 p.s.i. at each repetition until 22.5 percent of the total tooth face area on the driving gear had been scuffed, the load corresponding to this point being considered the scuff load. Scuffing is defined as that degree of wear or abrasion which obliterates the axial grinding marks on the gear tooth. The loading pressures used were as follows: 2, 5, 10, 15, 20, 25, 30, 35, 40, 45, 50, 55, 60, 65, 70, 75, 80 p.s.i. and up. A tooth load conversion factor of 18.5 sq. in. which was a constant calculated from measured data from the tester, was multiplied by the loading pressure at the scuff load and divided by the width of the driving gear (0.25) to obtain the tooth load in pounds per inch. The results obtained using the above test procedure on various lubricating oil compositions including that of the invention are set forth in the following table:

TABLE I.—HIGH SPEED RYDER GEAR TEST

| Oil: | Tooth load, p.p.i. |
|---|---|
| Base oil A | 2780 |
| Base oil B | 1670 |
| Base oil C | 1205 |
| Base oil A+0.5 wt. percent di-(t-$C_{18}$–$C_{22}$ alkyl primary amine) monofluorophosphate | 4300 |
| Base oil A+0.5 wt. percent mono-(t-$C_{18}$–$C_{22}$ alkyl primary amine) difluorophosphate | 3475 |
| Base oil A+0.5 wt. percent mono-(t-$C_{18}$–$C_{22}$ alkyl primary amine) monofluorophosphate | 4250 |
| Base oil A+0.5 wt. percent mono-trioctylamine monofluorophosphate | 4370 |
| Base oil A+0.5 wt. percent bis-(di-2-ethylhexyl amine) monofluorophosphate | 3260 |
| Base oil A+1.0 wt. percent di-dodecylaniline monofluorophosphate | 3970 |
| Base oil B+1.0 wt. percent di-trioctylamine monofluorophosphate | 4380 |
| Base oil C+0.25 wt. percent di-(t-$C_{18}$–$C_{22}$ alkyl primary amine) monofluorophosphate | 3730 |

In the above test base oil A was pentaerythritol tetracaproate. Base oil B was 2-ethylhexyl sebacate plus a trace of sebacic acid. Base oil C was a distillate mineral oil paraffin base having an SUS viscosity at 210° F. of between 125 and 135.

In the Ryder Gear Test shown above in Table I, base oil A, B and C gave results of 2780 p.p.i., 1670 p.p.i. and 1205 respectively as compared to the 3200 minimum specified for jet engine lubricant use in MIL–L–25336. Table I demonstrates the dramatic improvement in the load-carrying ability of these base oils when the additives of the present invention are included therein. In the Ryder Gear Test values of from 3260 p.p.i. to more than 4370 p.p.i. were obtained for all samples containing the amine fluorophosphate salts of the present invention.

The dramatic load carrying ability of the compositions of the present invention is also demonstrated in the Mean Hertz Load Test. The procedure and apparatus of the Mean Hertz Load Test is described in U.S. Patent 2,600,058. The base oils used in this test are the same as those described for the Ryder Gear Test shown above.

TABLE II.—MEAN HERTZ LOAD TEST

| Oil: | Mean Hertz Load |
|---|---|
| Base oil A | 19 |
| Base oil A+0.5 wt. percent mono-(t-$C_{18}$–$C_{22}$ alkyl primary amine) monofluorophosphate | 42 |
| Base oil A+0.5 wt. percent mono-trioctylamine monofluorophosphate | 49 |

The data in the foregoing Table II fully demonstrates that the fluorophosphate salts of the present invention promote unexpected and improved extreme pressure activity in the base oil shown. The addition of no additive to the base oil gave a reading of 19. However, where the fluorophosphate salts of the present invention were added the base oil gave a value of more than double ranging from 42 to 49. This, therefore, obviously indicates the unexpected results that are obtained by the use of the amine fluorophosphate salts as lubricating oil additives.

In addition to the load-carrying properties of the additives of the present invention shown in Tables I and II above, the amine salts of fluorophosphoric acids also have demonstrated that they do not adversely affect the oxidation and corrosion resistance characteristics of base lubricating oils. The lubricating compositions of the present invention fully meet the requirements of oxidation and corrosion resistance as set forth in Military Specification, MIL–L–7808D.

As is known in the art, many organo phosphate compounds do not always perform as satisfactory additives for lubricants, fuels and the like because of the hydrolytic instability and it is to this end that the salts of the present invention demonstrate at least one of their advanages. The amine salts of the fluorophosphoric acids of the present invention are hydrolytically stable in both water and lubricating oils.

As is clear from the foregoing disclosure and examples, considerable latitude may be exercised in the choice of the amines in forming the salts for the present invention.

We claim:
1. A lubricating composition comprising a major portion of a lubricating oil and an amine salt in an amount sufficient to improve the load-carrying capacity of said lubricating oil, said amine salt having a formula selected from the group consisting of:

(a) $(R''R'RN^+H)_2P=O_3F$
(b) $R''R'RN^+HP^-O_2F_2$
(c) $R''R'RN^+HP^-F_6$
(d) $(R''R'RN^+H)HP^-O_3F$ and (e) 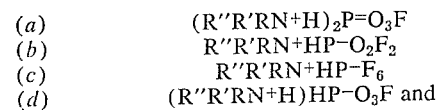 $P=O_3F$ wherein R is selected from the group consisting of hydrocarbyl radicals and hydroxy substituted hydrocarbyl radicals containing from 1 to about 30 carbon atoms and R' and R'' are selected from the group consisting of hydrogen hydrocarbyl radicals and hydroxy-substituted hydrocarbyl radicals containing 1 to about 24 carbon atoms.

2. A lubricating composition comprising a major portion of a lubricating oil and an amine salt in an amount sufficient to improve the load-carrying capacity of said lubricating oil, said amine salt having the formula:

$$(RNH_3)_2PO_3F$$

wherein R is a mixture of alkyl groups containing 18 to 22 carbon atoms.

3. A lubricating composition comprising a major portion of a lubricating oil and an amine salt in an amount sufficient to improve the load-carrying capacity of said lubricating oil, said amine salt having the formula:

$$[(C_{15}H_{11})_3NH]HPO_3F$$

4. A lubricating composition comprising a major portion of a lubricating oil and an amine salt in an amount sufficient to improve the load-carrying capacity of said lubricating oil, said amine salt having the formula:

$$[(C_8H_{17})_3NH]PO_2F_2$$

5. A lubricating composition comprising a major portion of a lubricating oil and an amine salt in an amount sufficient to improve the load-carrying capacity of said lubricating oil, said amine salt having the formula:

$$[RNH_3]HPO_3F$$

wherein R is a mixture of alkyl groups containing 18 to 22 carbon atoms.

6. A lubricating composition comprising a major portion of a lubricating oil and an amine salt in an amount sufficient to improve the load-carrying capacity of said lubricating oil, said amine salt having the formula:

$$[(C_8H_{17})_3NH]HPO_3F$$

7. A lubricating composition comprising a major portion of a lubrication oil and an amine salt in an amount sufficient to improve the load-carrying capacity of said lubricating oil, said amine salt having the formula:

$$[(C_4H_9CH(C_2H_5)CH_2)_2NH_2]_2PO_3F$$

8. A lubricating composition comprising a major portion of a lubricating oil and an amine salt in an amount sufficient to improve the load-carrying capacity of said lubricating oil, said amine salt having the formula:

$$[C_{12}H_{23}-C_6H_4NH_3]_2PO_3F$$

References Cited

UNITED STATES PATENTS

| | | | |
|---|---|---|---|
| 1,960,712 | 5/1939 | Reimers | 260—583 |
| 3,152,160 | 10/1964 | Harrison | 260—563 |
| 2,417,827 | 3/1947 | Jones | 252—49 |
| 2,599,365 | 6/1952 | Berger et al. | 260—293 |
| 2,636,881 | 4/1953 | Schultz | 260—293 |
| 2,744,871 | 5/1956 | Williams et al. | 252—49 |

CHARLES B. PARKER, *Primary Examiner.*

R. L. RAYMOND, *Assistant Examiner.*

U.S. Cl. X.R.

260—293, 563, 577, 583, 584